United States Patent
Liu et al.

(10) Patent No.: US 11,166,340 B2
(45) Date of Patent: Nov. 2, 2021

(54) COMPOSITE CERAMIC ATOMIZER AND METHOD OF PREPARING THE SAME

(71) Applicant: HUBEI CHINA TOBACCO INDUSTRY CO., LTD., Hubei (CN)

(72) Inventors: Bing Liu, Hubei (CN); Yikun Chen, Hubei (CN); Chenghao Luo, Hubei (CN); Huachen Liu, Hubei (CN); Weichang Ke, Hubei (CN); Fuyou Qi, Hubei (CN); Tengfei Deng, Hubei (CN)

(73) Assignee: HUBEI CHINA TOBACCO INDUSTRY CO., LTD.

( * ) Notice: Subject to any disclaimer, the term of this patent is extended or adjusted under 35 U.S.C. 154(b) by 105 days.

(21) Appl. No.: 16/610,561

(22) PCT Filed: Jun. 14, 2017

(86) PCT No.: PCT/CN2017/088245
§ 371 (c)(1),
(2) Date: Nov. 4, 2019

(87) PCT Pub. No.: WO2018/201561
PCT Pub. Date: Nov. 8, 2018

(65) Prior Publication Data
US 2021/0112869 A1    Apr. 22, 2021

(30) Foreign Application Priority Data

May 5, 2017    (CN) .......................... 201710310965.4

(51) Int. Cl.
*A24F 13/00*    (2006.01)
*A24F 17/00*    (2006.01)
(Continued)

(52) U.S. Cl.
CPC .......... *H05B 1/0227* (2013.01); *A24F 40/44* (2020.01); *A24F 40/46* (2020.01); *A24F 40/48* (2020.01);
(Continued)

(58) Field of Classification Search
CPC .......... A24F 40/44; A24F 40/46; A24F 40/10; A24F 40/70; B05B 1/0227; B05B 3/283
(Continued)

(56) References Cited

U.S. PATENT DOCUMENTS

| | | | |
|---|---|---|---|
| 10,506,827 B2 * | 12/2019 | Guo ........................ | A24F 40/70 |
| 2015/0250231 A1 * | 9/2015 | Hon ..................... | H05B 1/0297 |
| | | | 131/329 |
| 2016/0235125 A1 | 8/2016 | Safari | |

FOREIGN PATENT DOCUMENTS

| CN | 103270808 | 1/2016 |
|---|---|---|
| CN | 205161888 | 4/2016 |

(Continued)

OTHER PUBLICATIONS

International Search Report for PCT/CN2017/088245 dated Feb. 1, 2018, 6 pages.
(Continued)

*Primary Examiner* — Hae Moon Hyeon
(74) *Attorney, Agent, or Firm* — Fresh IP PLC; Clifford D. Hyra; Aubrey Y. Chen

(57) ABSTRACT

A composite ceramic atomizer includes a first main body and a second main body that are integrally formed by using a glazing and sealing process, and the first main body is connected to the second main body through a glazed surface formed by glazing. The glazed surface completely or partially covers a surface at the joint between the first main body and the second main body. The first main body includes a heating carrier and a conductive path for heating,
(Continued)

where the conductive path is formed on a surface of or inside the heating carrier and has a first contact part and a second contact part connected to a power supply. The second main body is used for liquid conduction. Further provided is a method for preparing the composite ceramic atomizer.

10 Claims, 3 Drawing Sheets

(51) Int. Cl.
*A24F 25/00* (2006.01)
*A24F 40/44* (2020.01)
*H05B 1/02* (2006.01)
*A24F 40/46* (2020.01)
*A24F 40/70* (2020.01)
*A24F 40/48* (2020.01)
*C03C 3/087* (2006.01)
*C03C 8/04* (2006.01)
*C03C 8/24* (2006.01)
*C04B 37/00* (2006.01)
*H05B 3/28* (2006.01)
*A24F 40/10* (2020.01)

(52) U.S. Cl.
CPC .............. *A24F 40/70* (2020.01); *C03C 3/087* (2013.01); *C03C 8/04* (2013.01); *C03C 8/24* (2013.01); *C04B 37/003* (2013.01); *H05B 3/283* (2013.01); *A24F 40/10* (2020.01); *C03C 2209/00* (2013.01); *C04B 2237/10* (2013.01); *C04B 2237/343* (2013.01); *C04B 2237/365* (2013.01); *C04B 2237/368* (2013.01); *C04B 2237/708* (2013.01); *H05B 2203/013* (2013.01); *H05B 2203/016* (2013.01); *H05B 2203/017* (2013.01); *H05B 2203/021* (2013.01)

(58) Field of Classification Search
USPC .................................................. 131/328, 329
See application file for complete search history.

(56) References Cited

FOREIGN PATENT DOCUMENTS

| | | |
|---|---|---|
| CN | 105725281 | 7/2016 |
| CN | 205585324 U | 9/2016 |
| CN | 205624474 | 10/2016 |
| CN | 205831072 | 12/2016 |
| CN | 205865992 U | 1/2017 |
| CN | 106418728 | 2/2017 |
| JP | 2004-203046 | 7/2004 |

OTHER PUBLICATIONS

Written Opinion of the ISA for PCT/CN2017/088245 dated Feb. 1, 2018, 4 pages.
Extended European Search Report dated Apr. 6, 2020, in European Application No. 17908423,1, 8 pages.
Russian Office Action dated Mar. 3, 2020 in Russian Application No. 2019139564/12(077839), with English summary, 8 pages.

* cited by examiner

COMPOSITE CERAMIC ATOMIZER AND METHOD OF PREPARING THE SAME

CROSS-REFERENCE TO RELATED APPLICATIONS

This application is the U.S. national phase of International Application No. PCT/CN2017/088245 filed Jun. 14, 2017 which designated the U.S. and claims priority to CN Patent Application No. 201710310965.4 filed May 5, 2017, the entire contents of each of which are hereby incorporated by reference.

FIELD OF THE INVENTION

The present invention relates to the field of electronic cigarette atomizer technologies, and in particular, to a composite ceramic atomizer and a method of preparing the same.

BACKGROUND OF THE INVENTION

Most of the existing electronic cigarette atomizers employ the structure described in Chinese Patent CN103270808B, wherein the atomizing core component includes an electric heating body and a liquid-penetrating piece nested on the electric heating body, and the electric heating body is formed by spirally winding a heating wire; at the same time, Chinese Patent CN205624474U discloses a ceramic heating atomizing core, which includes a ceramic heating body and an oil-guiding body for supplying a smoke oil to the ceramic heating body, characterized in that the ceramic heating body includes a ceramic base and a heating element formed integrally with the ceramic base, the oil-guiding body is a cotton fabric wrapping the ceramic heating body, and the cotton fabric is configured to soak up the smoke oil flow in through the oil inlet.

The atomizers introduced above are each constituted by discrete functional parts, which can only be formed into a whole when being fixed by a certain external force applied thereto or by a further physical structure, but the assembly process is complex and the discrete functional parts are susceptible to detachment.

SUMMARY OF THE INVENTION

It is an object of the present invention to overcome the disadvantages of the above prior art and to provide a composite ceramic atomizer applicable for electronic cigarettes and a method of preparing the same, wherein the atomizer can be formed integrally as a whole via a special firing process.

According to a first aspect of the invention, there provides a composite ceramic atomizer, which includes a first main body and a second main body formed integrally with the first main body via a glazing and sealing process, with the first main body and the second main body being jointed via a glazed surface formed by glazing, and the glazed surface completely or partially covering the joint between the first main body and the second main body, wherein the first main body includes a heating carrier and a conductive path for heating, the conductive path is formed on a surface of or inside the heating carrier and includes a first contact part and a second contact part both configured for connecting to a power supply, and the second main body is used for liquid transmission.

Further, the conductive path is printed on the heating carrier via a circuit printer and then the conductive path and the heating carrier are fired in a reducing atmosphere at a sufficient temperature for a certain time duration to form the first main body.

Further, the temperature for firing the first main body is 1400° C.-1600° C., the reducing atmosphere is $H_2$ atmosphere, and the time duration for firing is 18 h-24 h.

Further, the conductive path completely or partially forms a resistance heating layer, the distance of which from the second main body does not exceed the thickness of the first main body.

Further, the distance between the resistance heating layer and the second main body is less than or equal to 0.3 mm to increase the heat utilization efficiency and improve the atomizing effect.

Further, the heating carrier is completely or partially formed of ceramic.

Further, the conductive path consists of a metal tungsten manganese slurry with porcelain powder mixed therein.

Further, the resistance heating layer completely or partially covers the surface of the first main body or is placed in the first main body, and the resistance value of the resistance heating layer is between 0.02-3Ω.

Further, the first contact part and the second contact part are in forms of at least one selected from a group consisting of: contact points; patterns or conductive wires that are defined between positive and negative poles of the power supply; and conductive rods with supporting functions.

Further, the second main body is completely or partially formed of alumina-based porous ceramic, silicon carbide porous ceramic or silicon nitride porous ceramic.

Further, the cross-sectional shapes of the first main body and the second main body are circles, hollow circles, rectangles or triangles, which may be formed via semidry molding, gel casting or injection molding, and finally firing.

Further, the first main body partially covers a surface of the second main body to reduce the overall heat loss of the first main body, increase the poriferous surface area of the second main body and improve the atomizing effect.

Further, the composite ceramic atomizer includes two first main bodies and one second main body, wherein the second main body is located between the two first main bodies, and the first main bodies are connected to the second main body via glazed surfaces formed by partially glazing at contacted regions therebetween.

Further, the smoke-releasing hole on the composite ceramic atomizer is a seam reserved at the joint of the first main body and the second main body, or a channel reserved in the first main body, or a channel reserved in the second main body.

According to a second aspect of the invention, there provides a method of preparing a composite ceramic atomizer, wherein the first main body and the second main body are integrally formed as a whole via a glazing and sealing process, and the specific process steps are as follows:

Step 1: glazing on the surface of the first main body, with the glazed surface thickness controlled to fall within a range of 5-40 μm, using a transparent glaze which includes the following components by mass percent: transparent frit 80%-94%, kaolin 5%-19% and carboxymethyl cellulose (CMC) 0.2%-1%, wherein the chemical compositions of the transparent frit comprise, by mass percent, $SiO_2$ 40%-60%, $Al_2O_3$ 2%-15%, $Na_2O$ 0-8%, $K_2O$ 0-5%, ZnO 3%-15%, BaO 2%-10%, CaO 5%-15% and MgO 0%-10%, the glaze has a fusion temperature of 600-1000° C., with a slurry viscosity of the glaze adjusted to 0.5-1.5 Pa·s before glazing; and performing processes of drying, sootblowing and water-wiping on the first main body; and Step 2: placing the first main body in a horizontal sagger, placing the second main body on the first main body, controlling the firing temperature to fall within a range of 700-1000° C., and controlling the melt viscosity η to fall within a range of 2<lgη<6.

Further, the glazing way in Step 1 is dry glazing or brushing glazing.

In the above process steps, the slurry viscosity of the glaze can greatly affect the brushing glazing process, the formulation of the transparent frit in the components of the glaze affects the melt viscosity (η), and the value of the melt viscosity (η) in turn directly affects the sealing effect. When the melt viscosity is small, the porous ceramic tends to absorb the glaze via capillary force; whereas when the viscosity is too large, the glaze may be unable to be spread, thereby causing a low degree of integration between the porous ceramic and the MCH ceramic. The melt viscosity should be controlled to fall within 2<lgη<6.

The beneficial effects of the invention lie in that: a porous ceramic material and a heating ceramic material are sealed and formed integrally via a glazing and firing process, thus the strength is high and the service life is long; and at the same time, a clean and safe porous ceramic material is used for fluid guiding, and a uniformly heating ceramic material is used for heating and atomizing, thus carbonization and frying of the smoke oil may be avoided.

DETAILED DESCRIPTION OF THE EMBODIMENTS

The technical solutions in the invention will be described clearly and fully below in conjunction with specific embodiments of the invention. It should be understood that, the specific embodiments described in this section are merely used for explaining the invention, rather than limiting the scope thereof.

Embodiment 1

Figure 1:
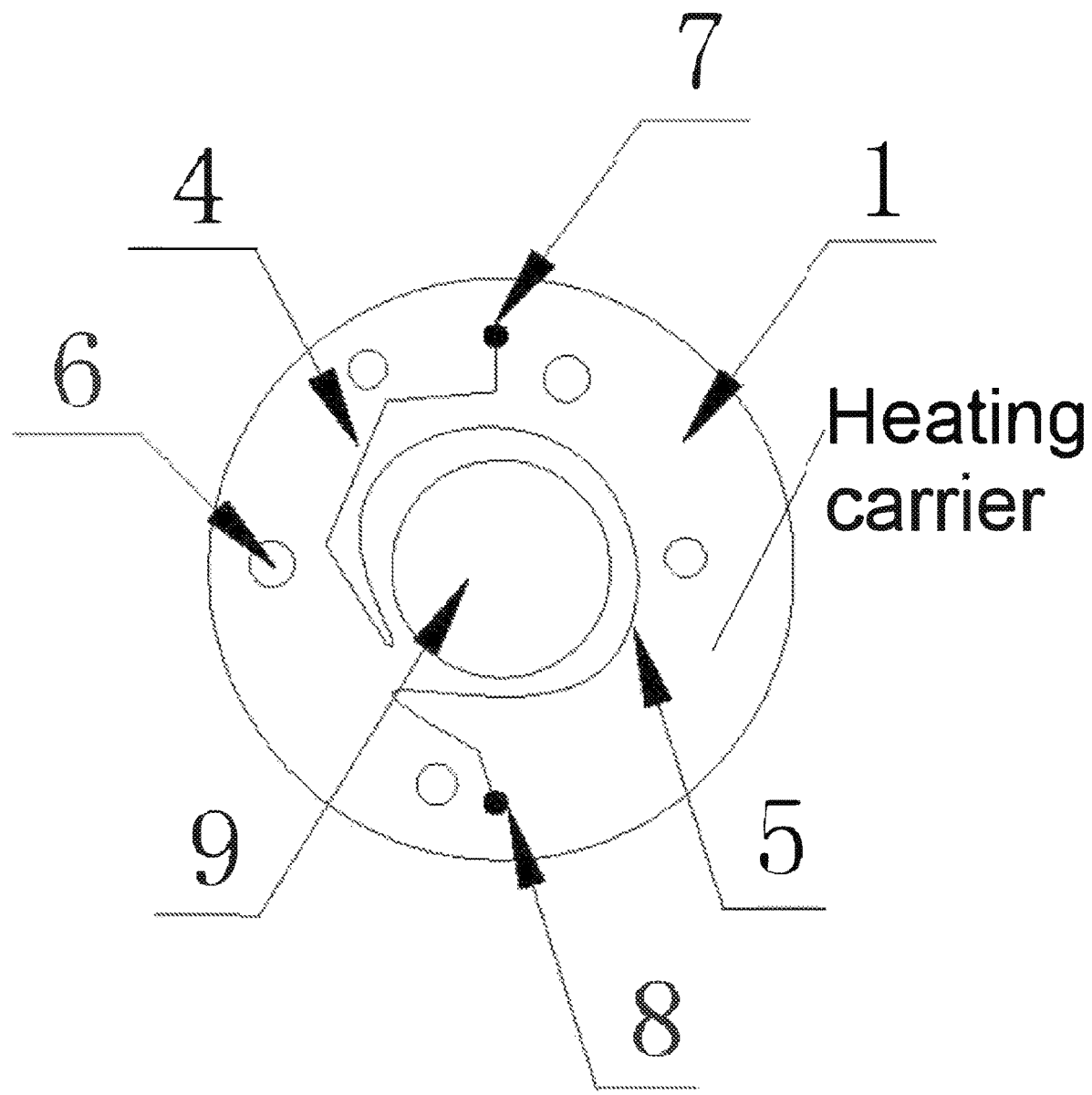
FIG. 1 is a top view of the first main body in Embodiment 1 of the invention.
Figure 2:
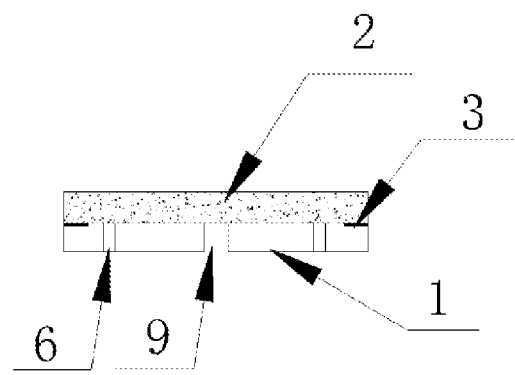
FIG. 2 is a side sectional view of Embodiment 1 of the invention.
Figure 3:
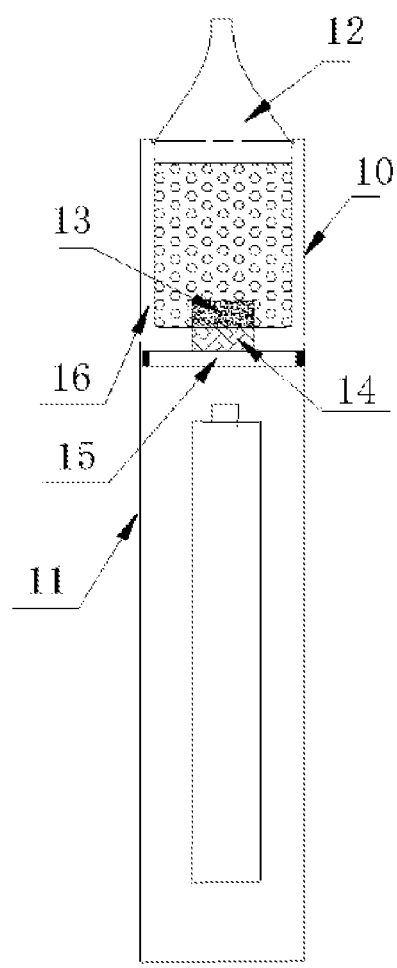
FIG. 3 is a structural representation of an electronic cigarette containing the atomizer according to Embodiment 1 of the invention.

Referring to FIG. 1, FIG. 2 and FIG. 3, a composite ceramic atomizer 14 includes a first main body 1 and a second main body 2, wherein the first main body 1 and the second main body 2 are integrally formed via a glazing and sealing process, with the first main body 1 and the second main body 2 jointed via a glazed surface 3 formed by glazing. The glazed surface 3 partially covers the joint between the first main body 1 and the second main body 2.

The first main body 1 includes a heating carrier and a conductive path 4 for heating, wherein the conductive path 4 is formed inside the heating carrier and has a first contact part 7 and a second contact part 8 configured for connecting to a power supply, and the second main body 2 is formed of a silicon nitride porous ceramic material and is used for liquid transmission.

The conductive path 4 may be formed by printing a resistance layer on the heating carrier via a circuit printer, and then the heating carrier and the resistance layer printed thereon are fired in a $H_2$ atmosphere at temperature of 1600° C. for 24 h to form the first main body 1. A part of the resistance layer lines in the conductive path 4 forms the resistance heating layer 5, and the rest resistance layer lines function as conductive wires. The distance between the resistance heating layer 5 and the second main body 2 is 0.1 mm. The heating carrier is completely formed of dense ceramic, and the resistance heating layer 5 may be made of a metal tungsten manganese slurry with porcelain powder mixed therein.

The resistance heating layer 5 is disposed in the first main body 1, and has a resistance value in a range of 0.02Ω to 3Ω. The conductive path 4 may form various patterns on the heating carrier. The first contact part 7 and the second contact part 8 are contact points.

The cross-sectional shapes of the first main body 1 and the second main body 2 include, but are not limited to, circles, hollow circles, rectangles and triangles, which may be formed via semidry molding, gel casting or injection molding, and finally firing.

The smoke-releasing hole of the composite ceramic atomizer 14 is a reserved hole 6 on the first main body or is formed by providing a hollow part 9.

As shown in FIG. 3, an electronic cigarette containing the composite ceramic atomizer 14 includes a first housing 10 and a second housing 11, wherein the first housing 10 and the second housing 11 are formed as a whole by nesting on each other, with a silica gel base 15 nested to be connected to the first housing 10, and with the composite ceramic atomizer 14 fixed on the silica gel base 15. The first housing 10 is provided with an oil cup 12, the bottom of which is provided with a groove 13, a fibrous oil guide cotton being provided in the groove 13, so that when the oil cup 12 is inserted into the first housing 10, the fibrous oil guide cotton in the groove 13 will contact the second main body 2 of the composite ceramic atomizer 14. A gas channel 16 is formed between the first housing 10 and the oil cup 12 for gas circulation.

When the electronic cigarette is used for smoking, the smoke oil in the oil cup 12 is transmitted to the surface of the second main body 2 via the fibrous oil guide cotton in the groove 13, then the first main body 1 atomizes the smoke oil on the second main body 2, and the atomized smoke gas escapes from the reserved hole 6, the hollow part 9 and the inside of the second main body 2 and then is inhaled by a consumer via the gas channel 16.

Embodiment 2

Figure 4:
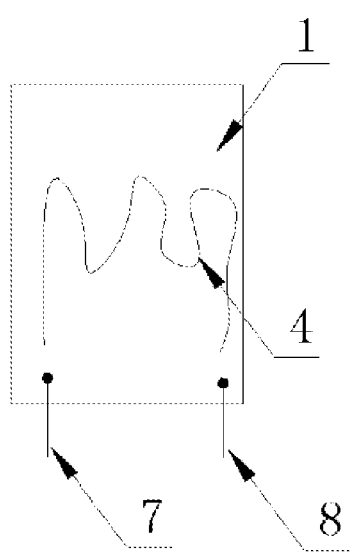
FIG. 4 is a top view of the first main body in Embodiment 2 of the invention.
Figure 5:
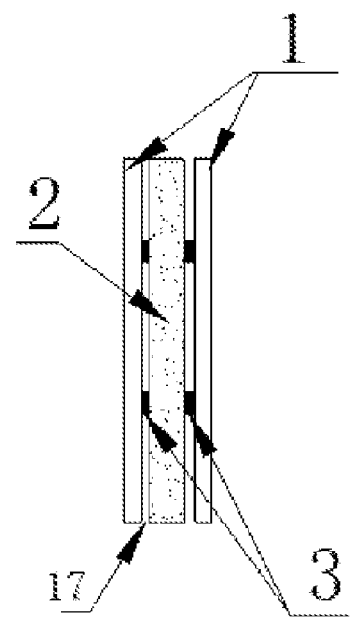
FIG. 5 is a side sectional view of Embodiment 2 of the invention, Wherein: 1—First Main Body, 2—Second Main Body, 3—Glazed Surface, 4—Conductive Path, 5—Resistance Heating Layer, 6—Hole, 7—First Contact Part, 8—Second Contact Part, 9—Hollow Part, 10—First Housing, 11—Second Housing, 12—Oil Cup, 13—Groove, 14—Composite ceramic atomizer, 15—Base, 17—Seam.

As shown in FIG. 4 and FIG. 5, a composite ceramic atomizer 14 includes a first main body 1 and a second main body 2, wherein the first main body 1 and the second main body 2 are integrally formed via a glazing and sealing process, with the first main body 1 and the second main body 2 jointed via a glazed surface 3 formed by glazing, the glazed surface 3 partially covering the joint between the first main body 1 and the second main body 2. The first main body 1 includes a heating carrier and a conductive path 4 for heating, wherein the conductive path 4 is formed on the surface of the heating carrier and has a first contact part 7 and a second contact part 8 configured for connecting to a power supply, and the first contact part 7 and the second contact part 8 being conductive rods in this embodiment. The second main body 2 is formed of silicon carbide porous ceramic for liquid transmission.

The conductive path 4 may be formed by printing a resistance layer on the heating carrier via a circuit printer, and then the heating carrier and the resistance layer printed thereon may be fired in a $H_2$ atmosphere at a temperature of 1400° C. for 18 h to form the first main body 1. The conductive path 4 completely forms the resistance heating layer, and the distance thereof from the second main body 2 is 0.3 mm. The heating carrier is partially formed of a dense ceramic, and the conductive path 4 may be made of a metal tungsten manganese slurry with porcelain powder mixed therein.

The conductive path 4 partially covers the surface of the first main body 1 and the resistance value of the resistance heating layer is in a range of 0.02 Ω to 3 Ω.

The smoke-releasing hole of the composite ceramic atomizer 14 is a reserved seam 17 at the joint of the first main body 1 and the second main body 2.

In the composite ceramic atomizer 14 of this embodiment, two first main bodies 1 and one second main body 2 are mutually contacted and combined in a certain structure and sequence to form a whole. As shown in FIG. 5, in one example, the composite ceramic atomizer is formed by two first main bodies 1 and one second main body 2, wherein the second main body 2 is located between the two first main bodies 1, and the first main bodies 1 are connected to the second main body 2 via glazed surfaces 3 formed by partially glazing at contacted regions therebetween, with the non-glazed part forming the seam 17.

In the embodiment, the cross-sectional shapes of the first main body 1 and the second main body 2 include, but are not limited to, circles, hollow circles, rectangles and triangles, which may be formed via semidry molding, gel casting or injection molding, and finally firing. In other embodiments, the first contact part 7 and the second contact part 8 may also be patterns or conductive wires defined between the positive and negative poles of the power supply.

Embodiment 3

A method of preparing a composite ceramic atomizer 14 is provided. The composite ceramic atomizer 14 is prepared by integrally forming a first main body 1 and a second main body 2 as a whole via a glazing and sealing process, and the specific process steps are as follows:

Step 1: the surface of the first main body 1 is glazed in a glazing way of dry glazing or brushing glazing, with the thickness of the glazed surface being 30 μm, using a transparent glaze, which includes the following components by mass percent:

transparent frit 80%, kaolin 19%, and carboxymethyl cellulose (CMC) 1%, wherein the chemical compositions of the transparent frit comprise, by mass percent, $SiO_2$ (60%), $Al_2O_3$ (15%), $Na_2O$ (2%), $K_2O$ (2%), ZnO (5%), BaO (5%), CaO (9%), MgO (2%); the fusion temperature of the glaze is 600-1000° C., and the viscosity of the glaze slurry before glazing is adjusted to 1.5 Pa·s; and processes such as drying, sootblowing and water-wiping, etc., are performed on the first main body;

Step 2: the first main body 1 is placed in a horizontal sagger, the second main body 2 is placed on the first main body 1, the firing temperature is controlled at 800° C., and the melt viscosity η is controlled as lgη=5.2.

Embodiment 4

A method of preparing a composite ceramic atomizer 14 is provided, wherein a first main body 1 and a second main body 2 are integrally formed as a whole via a glazing and sealing process, and the specific process steps are as follows:

Step 1: the surface of the first main body 1 is glazed, with the thickness of the glazed surface being 40 μm, in a glazing way of dry glazing or brushing glazing, using a transparent glaze, which includes the following components by mass percent:

transparent frit 94%, kaolin 5.8% and carboxymethyl cellulose (CMC) 0.2%; wherein the chemical compositions of the transparent frit include, by mass percent, $SiO_2$ (50%), $Al_2O_3$ (12%), $Na_2O$ (4%), $K_2O$ (2%), ZnO (10%), BaO (2%), CaO (12%), MgO (8%); the fusion temperature of the glaze is 600-1000° C., the viscosity of the glaze slurry before glazing is adjusted to 0.5 Pa·s, and processes such as drying, sootblowing and water-wiping, etc., are performed on the first main body 1;

Step 2: the first main body 1 is placed in a horizontal sagger, the second main body 2 is placed on the first main body 1, and then another first main body 1 is placed on the second main body 2, the firing temperature is controlled at 1000° C., and the melt viscosity η is controlled as lgη=4.5.

Embodiment 5

A method of preparing a composite ceramic atomizer 14 is provided, wherein the first main body 1 and the second main body 2 are integrally formed as a whole via a glazing and sealing process, and the specific process steps are as follows:

Step 1: the surface of the first main body 1 is glazed, with the thickness of the glazed surface being 40 μm, in a glazing way of dry glazing or brushing glazing, using a transparent glaze, which includes the following components by mass percent:

transparent frit 94%, kaolin 5.5% and carboxymethyl cellulose (CMC) 0.5%, wherein the chemical compositions of the transparent frit include, by mass percent, $SiO_2$ (50%), $Al_2O_3$ (10%), $Na_2O$ (8%), $K_2O$ (5%), ZnO (10%), BaO (2%), CaO (7%), MgO (8%); the fusion temperature of the glaze is 600-1000° C., the viscosity of the glaze slurry before glazing is adjusted to 0.8 Pa·s, and processes such as drying, sootblowing and water-wiping, etc., are performed on the first main body 1;

Step 2: the first main body 1 is placed in a horizontal sagger, the second main body 2 is placed on the first main body 1, the firing temperature is controlled at 1000° C., and melt viscosity n is controlled as lgη=3.

| Item | Formulation | Slurry Viscosity | Melt Viscosity (lgη) | Composite Ceramic Performance | | |
|---|---|---|---|---|---|---|
| | | | | Bond Strength At Joint | Porosity Conductivity At Joint | Thermal At Joint |
| Embodiment | Transparent Frit 80%, Kaolin 19%, | 1.5 Pa·s | 5.2 | 10 MPa | 50% | 8 W/(m·K) |

-continued

| Item | Formulation | Composite Ceramic Performance | | | | |
|---|---|---|---|---|---|---|
| | | Slurry Viscosity | Melt Viscosity (lgη) | Bond Strength At Joint | Porosity Conductivity At Joint | Thermal At Joint |
| 3 | Carboxymethyl Cellulose (CMC) 1%; Chemical Composition Of Transparent Frit: SiO$_2$ (60%), Al$_2$O$_3$ (15%), Na$_2$O (2%), K$_2$O (2%), ZnO (5%), BaO (5%), CaO (9%), MgO (2%) | | | | | |
| Embodiment 4 | Transparent Frit 94%, Kaolin 5.8%, Carboxymethyl Cellulose (CMC) 0.2%; Chemical Composition Of Transparent Frit: SiO$_2$ (50%), Al$_2$O$_3$ (12%), Na$_2$O (4%), K$_2$O (2%), ZnO (10%), BaO (2%), CaO (12%), MgO (8%) | 0.5 Pa·s | 4.5 | 11 MPa | 45% | 9 W/(m·K) |
| Embodiment 5 | Transparent Frit 94%, Kaolin 5.5%, Carboxymethyl Cellulose (CMC) 0.5%; Chemical Composition Of Transparent Frit: SiO$_2$ (50%), Al$_2$O$_3$ (10%), Na$_2$O (8%), K$_2$O (5%), ZnO (10%), BaO (2%), CaO (7%), MgO (8%) | 0.8 Pa·s | 3 | 18 MPa | 52% | 9.2 W/(m·K) |

Carboxymethyl Cellulose (CMC) is mainly used for adjusting the viscosity of the glaze slurry so as to make it spread well in the brushing glazing process, without infiltrating into the second main body. Further, in the formulation of the glaze, the higher the SiO$_2$ content in the transparent frit is, the lower the contents of K$_2$O and Na$_2$O will be, and thus in the high temperature state of sintering, the melt viscosity is higher, which leads to worse contact by the glaze with the first main body and the second main body, thus resulting in low bond strength between the glaze and the first and second main bodies; also, the lower the SiO$_2$ content in the transparent frit is, the higher the contents of K$_2$O and Na$_2$O will be, and thus in the high temperature state of sintering, the melt viscosity is lower, which leads to that the glaze infiltrates into the second main body further, thus the pores in the second main body are blocked, but the bond strength between the glaze and the second main body is not high enough. Therefore, an appropriate formulation, including slurry viscosity and melt viscosity, is the key point of the technology.

The above description only shows some specific embodiments of the invention, rather than limiting the protection scope of the invention. All variations or substitutions made by one skilled in the art within the scope of technical disclosure of the invention shall fall into the protection scope of the invention.

What is claimed is:

1. A composite ceramic atomizer, comprising:
a first main body and a second main body formed integrally with the first main body via a glazing and sealing process, with the first main body and the second main body being jointed via a glazed surface formed by glazing, and the glazed surface completely or partially covering the joint between the first main body and the second main body,
wherein the first main body includes a heating carrier and a conductive path for heating, the conductive path is formed on a surface of or inside the heating carrier and includes a first contact part and a second contact part both configured for connecting to a power supply, and the second main body is used for liquid transmission,
wherein the conductive path completely or partially forms a resistance heating layer,
wherein a distance between the resistance heating layer and the second main body is less than or equal to a thickness of the first main body,
wherein the glazed surface uses a transparent glaze comprising the following components by mass percent: transparent frit 80%-94%, kaolin 5%-19% and carboxymethyl cellulose (CMC) 0.2%-1%, and
wherein chemical compositions of the transparent frit comprise, by mass percent, SiO$_2$ 40%-60%, Al$_2$O$_3$ 2%-15%, Na$_2$O 0-8%, K$_2$O 0-5%, ZnO 3%-15%, BaO 2%-10%, CaO 5%-15% and MgO 0%-10%.

2. The composite ceramic atomizer of claim 1, wherein the first main body partially covers a surface of the second main body to reduce an overall heat loss of the first main body, increase a poriferous surface area of the second main body and improve an atomizing effect.

3. The composite ceramic atomizer of claim 1, wherein the distance between the resistance heating layer and the second main body is less than or equal to 0.3 mm.

4. The composite ceramic atomizer of claim 1, wherein the resistance heating layer completely or partially covers a surface of the first main body or is placed in the first main body, and a resistance value of the resistance heating layer is in a range of 0.02Ω to 3Ω.

5. The composite ceramic atomizer of claim 1, wherein the conductive path is printed on the heating carrier via a circuit printer and then the conductive path and the heating carrier are fired in a H$_2$ atmosphere at a temperature in a range of 1400° C. to 1600° C. for 18 to 24 hours to form the first main body.

6. The composite ceramic atomizer of claim 1, wherein the first contact part and the second contact part are in forms of at least one selected from a group consisting of: contact points, patterns or conductive wires that are defined between positive and negative poles of the power supply, and conductive rods with supporting functions.

7. The composite ceramic atomizer of claim 1, wherein the second main body is completely or partially formed of alumina-based porous ceramic, silicon carbide porous ceramic or silicon nitride porous ceramic.

8. The composite ceramic atomizer of claim 1, wherein a smoke-releasing hole on the composite ceramic atomizer is a seam reserved at the joint between the first main body and the second main body, or a channel reserved in the first main body, or a channel reserved in the second main body.

9. A method of preparing the composite ceramic atomizer as claim 1, comprising:
Step 1: glazing on a surface of the first main body, with a thickness of the glazed surface controlled to fall within a range of 5-40 µm, using a transparent glaze which comprises the following components by mass percent: transparent frit 80%-94%, kaolin 5%-19% and carboxymethyl cellulose (CMC) 0.2%-1%, wherein chemical compositions of the transparent frit comprise, by mass percent, $SiO_2$ 40%-60%, $Al_2O_3$ 2%-15%, $Na_2O$ 0-8%, $K_2O$ 0-5%, ZnO 3%-15%, BaO 2%-10%, CaO 5%-15% and MgO 0%-10%, the glaze has a fusion temperature of 600-1000° C., with a slurry viscosity of the glaze adjusted to 0.5-1.5 Pa·s before glazing; and performing processes drying, sootblowing and water-wiping on the first main body;

Step 2: placing the first main body in a horizontal sagger, placing the second main body on the first main body, controlling a firing temperature to fall within a range of 700-1000° C., and controlling a melt viscosity $\eta$ to fall within a range of $2<\lg\eta<6$.

10. The method of preparing the composite ceramic atomizer of claim 9, wherein the glazing in Step 1 is performed in a way of dry glazing or brushing glazing.

\* \* \* \* \*